US008363796B2

(12) United States Patent
Adkar et al.

(10) Patent No.: US 8,363,796 B2
(45) Date of Patent: *Jan. 29, 2013

(54) SELECTION AND INITIATION OF IVR SCRIPTS BY CONTACT CENTER AGENTS

(75) Inventors: Ashutosh Adkar, Pune (IN); Amey Kulkarni, Pune (IN); Paul Roller Michaelis, Louisville, CO (US); Anand Paithankar, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 367 days.

This patent is subject to a terminal disclaimer.

(21) Appl. No.: 12/579,842

(22) Filed: Oct. 15, 2009

(65) Prior Publication Data

US 2011/0091021 A1    Apr. 21, 2011

(51) Int. Cl.
H04M 1/64    (2006.01)
H04M 11/00    (2006.01)
H04M 3/42    (2006.01)

(52) U.S. Cl. .................... 379/88.23; 379/87; 379/88.14; 379/202.01; 455/416

(58) Field of Classification Search .... 379/88.11–88.25, 379/221.01, 207.16, 179, 93.25, 87; 455/403, 455/452.1, 445, 564; 370/260, 403; 709/204–205, 709/231, 246, 217, 226; 715/751–753
See application file for complete search history.

(56) References Cited

U.S. PATENT DOCUMENTS

| 6,611,804 | B1 | 8/2003 | Dorbecker et al. |
| 6,842,503 | B1 | 1/2005 | Wildfeuer |
| 7,079,628 | B1 | 7/2006 | Burritt et al. |
| 7,099,440 | B2 | 8/2006 | Michaelis |
| 7,162,012 | B2 | 1/2007 | Freundlich et al. |
| 7,174,004 | B1 | 2/2007 | Michaelis |
| 7,174,009 | B1* | 2/2007 | Zhang et al. ............. 379/221.01 |
| 7,376,127 | B2 | 5/2008 | Hepworth et al. |
| 7,379,431 | B2 | 5/2008 | Michaelis |
| 7,386,100 | B2 | 6/2008 | Michaelis |
| 7,487,210 | B2* | 2/2009 | Ludwig et al. ................ 709/204 |
| 7,561,873 | B2 | 7/2009 | Angelopoulos et al. |
| 7,567,653 | B1 | 7/2009 | Michaelis |

(Continued)

FOREIGN PATENT DOCUMENTS

| CA | 2391428 | 3/1997 |
| WO | WO 98/20409 | 5/1998 |

(Continued)

OTHER PUBLICATIONS

Extended European Search Report for European Patent Application No. 10181568.6, mailed Jan. 28, 2011, 7 pages.

(Continued)

*Primary Examiner* — Mohammad Islam

(74) *Attorney, Agent, or Firm* — Sheridan Ross P.C.

(57) ABSTRACT

Methods, devices and systems for selecting IVR script and initiating that IVR script are provided. More specifically, playback of an IVR script to a user of a client endpoint can be initiated by an agent at a content sharing endpoint selecting, dragging, and dropping a representation of that IVR script onto a representation of the voice communication session. After initiation of the IVR script, the agent can drop off of the call, leaving the IVR system to interact with the client endpoint without requiring further agent involvement.

18 Claims, 4 Drawing Sheets

U.S. PATENT DOCUMENTS

| | | | |
|---|---|---|---|
| 7,653,192 B1* | 1/2010 | Sylvain | 379/202.01 |
| 2001/0008837 A1* | 7/2001 | Takahashi | 455/403 |
| 2003/0145056 A1* | 7/2003 | Fujisawa et al. | 709/205 |
| 2004/0059841 A1 | 3/2004 | Bateman et al. | |
| 2004/0204116 A1* | 10/2004 | Ben-Efraim et al. | 455/564 |
| 2006/0233326 A1 | 10/2006 | Erhart et al. | |
| 2007/0036370 A1* | 2/2007 | Granovetter et al. | 381/311 |
| 2007/0121657 A1* | 5/2007 | Boillot et al. | 370/403 |
| 2007/0168463 A1* | 7/2007 | Rothschild | 709/217 |
| 2007/0197227 A1* | 8/2007 | Naqvi et al. | 455/445 |
| 2007/0275757 A1* | 11/2007 | Yoo et al. | 455/557 |
| 2007/0286100 A1* | 12/2007 | Saaranen et al. | 370/260 |
| 2007/0294425 A1* | 12/2007 | Sobti et al. | 709/231 |
| 2008/0096603 A1* | 4/2008 | Sparre | 455/550.1 |
| 2008/0190271 A1* | 8/2008 | Taub et al. | 84/645 |
| 2008/0239994 A1* | 10/2008 | Xiong et al. | 370/260 |
| 2008/0274744 A1* | 11/2008 | Naqvi | 455/445 |
| 2009/0074208 A1 | 3/2009 | Roh | |
| 2009/0094531 A1* | 4/2009 | Danieli et al. | 715/753 |
| 2009/0111378 A1* | 4/2009 | Sheynman et al. | 455/41.1 |
| 2009/0327917 A1* | 12/2009 | Aaron et al. | 715/751 |
| 2010/0061276 A1* | 3/2010 | Havens et al. | 370/260 |
| 2010/0080361 A1* | 4/2010 | Houghton | 379/87 |
| 2010/0131978 A1* | 5/2010 | Friedlander et al. | 725/37 |
| 2010/0227597 A1* | 9/2010 | Guccione | 455/416 |
| 2010/0278321 A1* | 11/2010 | Sharp | 379/88.22 |
| 2011/0282978 A1* | 11/2011 | Paithankar | 709/221 |

FOREIGN PATENT DOCUMENTS

WO    WO 2004/091168    10/2004

OTHER PUBLICATIONS

U.S. Appl. No. 12/579,775, filed Oct. 15, 2009, Adkar.
Official Action for U.S. Appl. No. 12/579,775, mailed Dec. 30, 2011 15 pages.
Official Action for U.S. Appl. No. 12/579,775, mailed May 10, 2012 18 pages.
Notice of Allowance for U.S. Appl. No. 12/579,775, mailed Aug. 23, 2012 8 pages.

* cited by examiner

SELECTION AND INITIATION OF IVR SCRIPTS BY CONTACT CENTER AGENTS

CROSS REFERENCE TO RELATED APPLICATIONS

This application is related to U.S. patent application Ser. No. 12/579,775, filed Oct. 15, 2009, Entitled "METHOD AND APPARATUS FOR UNIFIED INTERFACE FOR HETEROGENEOUS SESSION MANAGEMENT", the entire disclosure of which is hereby incorporated herein by reference.

FIELD

The present invention is directed to the selection and initiation of interactive voice response scripts by contact center agents. More particularly, methods and apparatuses for facilitating the selection of IVR scripts for presentation to a client are provided.

BACKGROUND

Call center agents have been used to provide customer service and support. In a typical scenario, a call service agent is assigned to handle a call by an automatic call distribution system. Once a communication channel is established between the agent and the customer, voice communications over the operative communication network or networks can begin. However, providing live agents to respond to customer requests is a relatively expensive solution, particularly where enough agents are provided to ensure that wait times for customers are relatively short. Conversely, where the number of available agents is limited, in order to save on costs, the wait times experienced by customers seeking assistance can be excessive.

In order to minimize the amount of time that a live, and presumably expensive, human agent must devote to one-on-one interactions with individual customers, many contact centers try to utilize automated attendant and automated interactive voice response (IVR) systems or applications to satisfy customer needs.

A typical automated attendant application answers inbound calls by presenting a simple menu, such as, "Thank you for calling XYZ Corporation. If you know the extension of the person you are calling, please dial it now. For sales, press or say One. For repairs, press or say Two. For information about store hours or locations, press or say Three." In general, the purpose of automated attendant systems is to permit callers to select the specific service or individual with which they wish to speak. Note that there is no automated ability for callers to enter data, ask questions, or select an option that was not presented by the menu.

In contrast with automated attendant applications, interactive voice response systems allow customers to call into a designated customer service telephone number and then conduct a wide variety of automated transactions. Illustratively, a typical IVR system maintained by an airline will allow customers to check schedules, check the number of "frequent flier" miles in their account, purchase tickets (either by credit card or by using "frequent flier" miles), make seat selections, check the anticipated arrival time of in-progress flights, and so on.

A problem with automated attendant systems and, to a much greater extent, IVR systems is that their menu structures tend to be very complicated, slow, non-intuitive, and hard to navigate. An especially frustrating problem for users is that they often take a wrong branch within the system's menu structure, don't realize the mistake until they have proceeded down a few more levels, and then are unable to navigate back to where they need to be.

Although contact centers that present IVR front ends often provide customers with the option of speaking to a live agent, the option to choose to speak with a live agent is often hidden and/or not presented until the caller has progressed several steps into the application. Indeed, in order to limit the number of customer requests that require the participation of a live agent, IVR systems increasingly omit an option to speak with a live agent, or make the option to speak with a live agent difficult to access. As a result, customers will often be frustrated and unhappy when they finally get to an agent. An even more troublesome outcome for the contact center is that customers may be motivated to hang-up and take their business elsewhere.

Analysis of IVR usability failures such as these reveals three interesting characteristics: (1) the IVR interactions in which user errors are most common are the portions in which customers are trying to specify the reason for the call, (2) a live contact center agent is not available to customers until after the customer has had an unsatisfactory experience with IVR, and (3) the IVR interactions that tend to go smoothly are the ones that occur after the caller's needs have been correctly identified.

A need exists for a system that increases customer satisfaction without increasing the amount of time that a live agent must spend with the customer.

SUMMARY

Systems and methods for routing a customer to an appropriate interactive voice response (IVR) system script are provided. More particularly, a customer is placed in contact with a contact center agent or user of a content sharing endpoint. The agent then engages in a preliminary discussion with the customer or user of an endpoint that is in communication with the contact center, to determine the user's needs. Then, using a facility that allows for the association of content in the form of a computer readable file or set of data to be shared with the user as part of a voice telephony communication, the agent can select and activate the appropriate IVR script for the customer.

In accordance with embodiments of the present invention, selecting and activating the appropriate IVR script includes the agent associating a computer file or set of data with the audio communication session. Associating the selected file with the audio communication session further includes receiving input from the agent that includes moving a representation of that file to a representation of the audio communication session. For example, the content may be included in a list of available computer files, while the audio communication session may be represented by information regarding that session graphically displayed to the user. The user selects one of the computer files from the listing, and drags that file to the representation of the audio communication session. The user then drops the file into the representation of the audio communication session.

In order to share the content of the selected computer file with users at other endpoints of the audio communication session, the content of the selected computer file is played as an audio output over the communication channel that is supporting the audio communication session, for example where the selected computer file comprises audible information. Where the selected computer file does not comprise audible information, a transformation of the content of the computer file may be performed. For example, a computer file containing text may be transformed using a text to speech application and then played as an audio output over the communication channel.

Additional features and advantages of embodiments of the present invention will become more readily apparent from the following description, particularly when taken together with the accompanying drawings.

DETAILED DESCRIPTION

Figure 1:
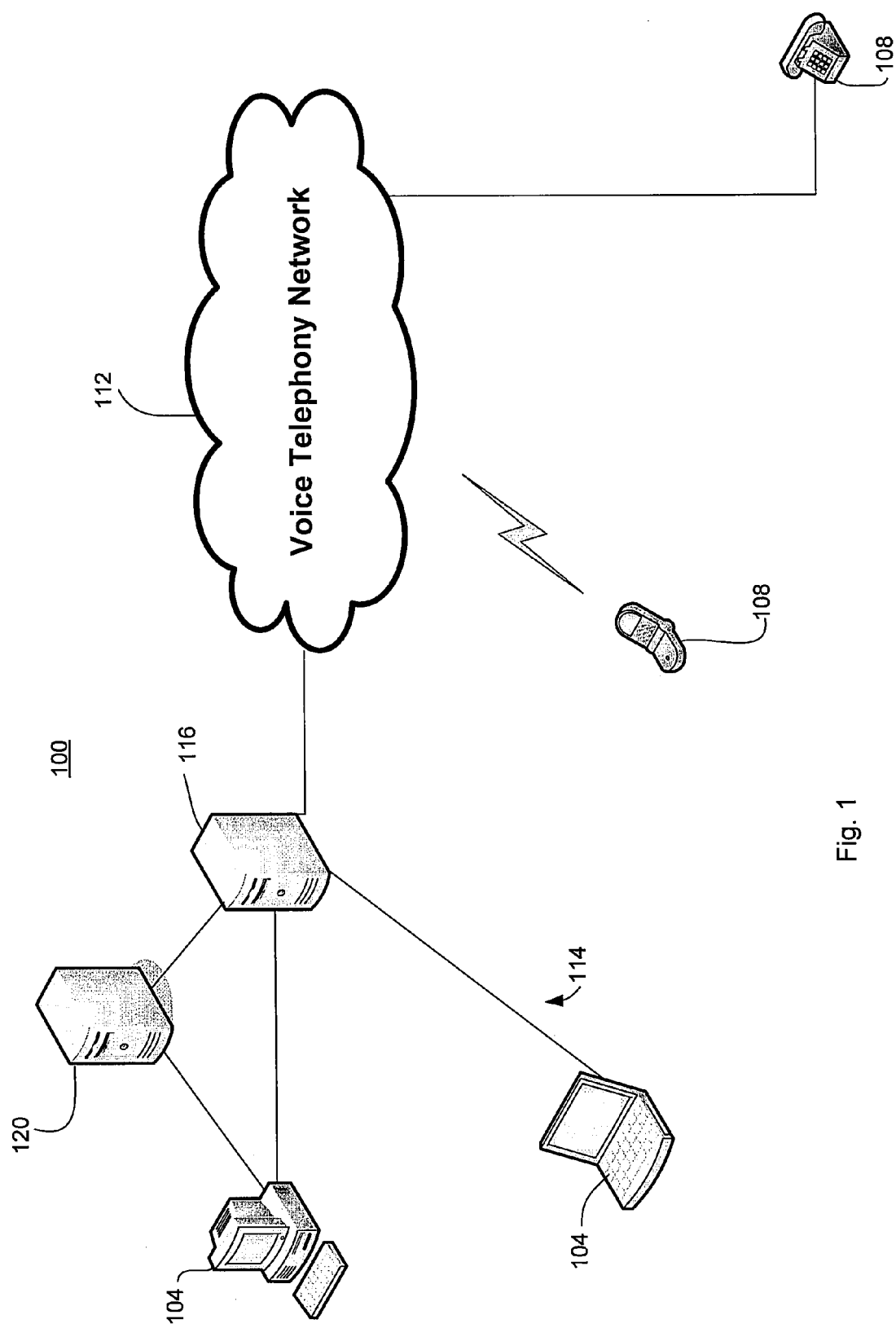
FIG. 1 is a diagram depicting components of a system in accordance with embodiments of the present invention.

FIG. 1 is a block diagram depicting components of a system 100 in accordance with embodiments of the present invention. In general, the system 100 includes one or more content sharing endpoints 104 and one or more client endpoints 108. In general, a content sharing endpoint 104 is placed in communication with a client endpoint 108 via a voice communication or voice telephony network 112. In accordance with at least some embodiments of the present invention, the content sharing endpoint 104 may be part of an enterprise network 114. Accordingly, a call server or an enterprise call server 116 may interconnect the content sharing endpoints 104 to the voice telephony network 112. A content server 120 may also be included. The content sharing endpoints 104, call server 116, and/or content server 120 may be interconnected to one another through direct, point to point connections, or through a network, such as a local area network.

The content sharing endpoints 104 generally comprise communication endpoints capable of supporting audio communications over a voice telephony network 112. In addition, the content sharing endpoints 104 can present information to a user or agent, and receive input from the user, in connection with a graphical user interface. Moreover, the user can select content for sharing with other endpoints 104, 108 through the graphical user interface. Accordingly, an example of a content sharing endpoint 104 is a general purpose computer running a communication application, such as a soft phone application, in addition to a content sharing application as described herein.

The client endpoint 108 is also an endpoint that is capable of supporting audio communications over a voice telephony network 112. However, the client endpoint 108 is not required to support a graphical user interface, or the output of content in a format other than in an audible format. Examples of a client endpoint 108 include a conventional public switched telephony network telephone, a cellular or other mobile telephone, or a soft phone running as part of a general purpose computer.

As noted above, the content sharing endpoint or endpoints 104 may be provided as part of an enterprise network 114. Whether part of an enterprise network 114 or not, a content sharing endpoint 104 may be associated with a call server, contact center server, or an enterprise call server 116. The call server 116 may comprise a communication server capable of running program instructions, including applications or other programming for distributing calls. For instance, the call server 116 may comprise a contact center server for distributing calls between the enterprise network and client endpoints 108. More particularly, the call server 116 may comprise an automatic call distribution (ACD) server. Alternatively or in addition, the contact center server may comprise an interactive voice response (IVR) system or server and/or an automated attendant. Moreover, a call server 116 comprising an IVR system may be capable of playing content 224 selected by a user of a content sharing endpoint 104, and of interacting with the user of a client endpoint 108, even if the content sharing endpoint 104 from which the content 224 was selected drops off of the call. In accordance with further embodiments, a content sharing endpoint 104 can be directly connected to the voice telephony network 112.

A content server 120 may be provided that is operatively interconnected to a content sharing endpoint 104. The content server 120 may operate as a repository of files that can be accessed by users of one or more content sharing endpoints 104, and may be connected to a content sharing endpoint 104 directly or through a network 114. For example, the content server 120, if provided, may store audio or text files that can be selected for sharing with the endpoints 104, 108 participating in an audio communication. This content may comprise interactive voice response (IVR) scripts or automated attendant scripts. Accordingly, the content server 120 may comprise an interactive voice response server and/or an automated attendant server, and/or may serve as a repository of files or scripts in support of the functions of an interactive voice response system on an automated attendant system.

As can be appreciated by one of skill in the art, the enterprise network 114 may incorporate a local area network. Examples of an enterprise network 114 therefore include an Ethernet Network, which may further comprise a virtual private network or an intranet.

The voice telephony network 112 could be any type of network capable of supporting voice communications between one or more content sharing endpoints 104 and one or more client endpoints 108. For example, the voice telephony network 112 may comprise a communication network, such as the public switched telephony network, a cellular telephony network, a satellite telephony network, the Internet, a private intranet, a local area network, and the like. In addition, the voice telephony network 112 may comprise a plurality of networks and/or a plurality of networks of different types. In addition, it should be appreciated that the voice telephony network 112 is not limited to a network or networks that are incapable of carrying data other than voice data.

Figure 2:
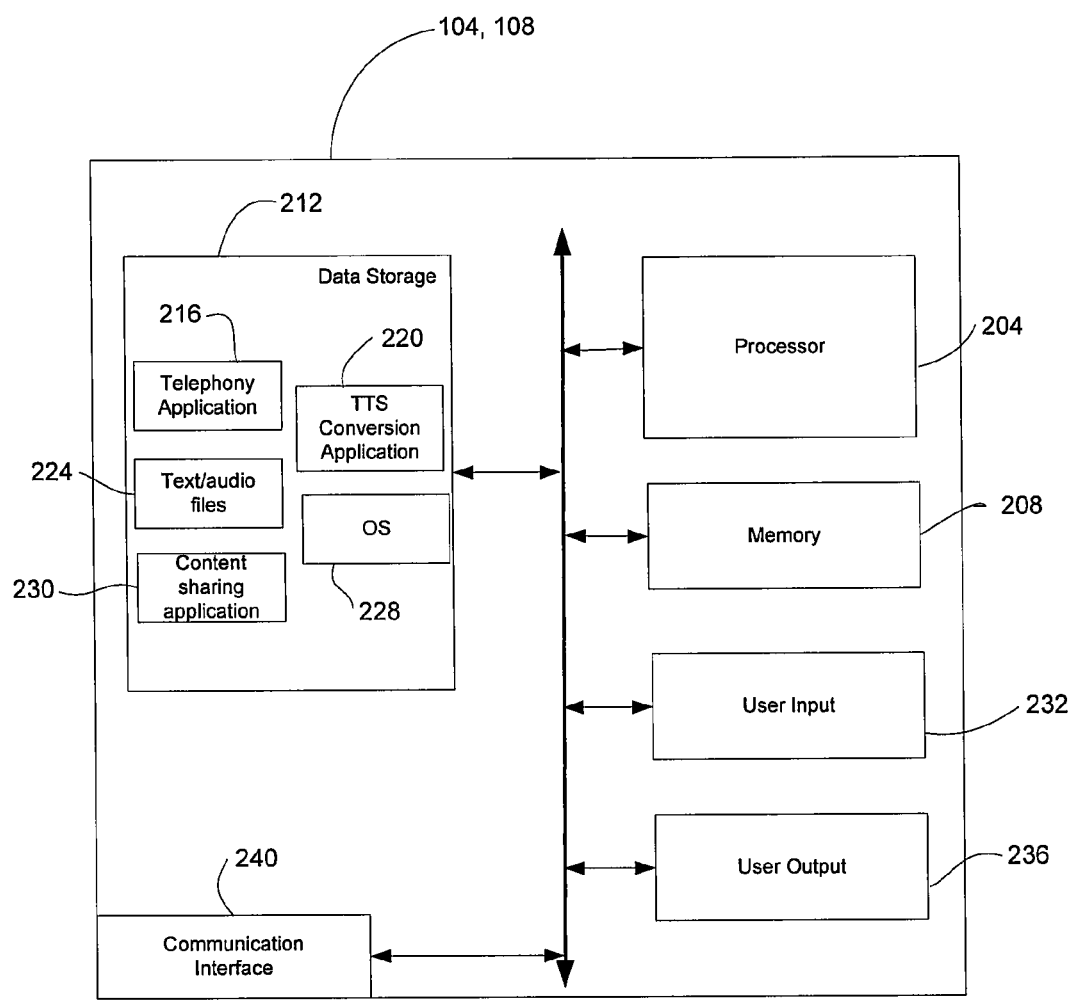
FIG. 2 is a block diagram of a communication endpoint in accordance with embodiments of the present invention.

FIG. 2 illustrates components of a content sharing endpoint 104 and/or a client endpoint 108 in accordance with embodiments of the present invention. The components may include a processor 204 capable of executing program instructions or software. Accordingly, the processor 204 may include any general purpose programmable processor or controller for executing application programming or instructions. As a further example, the processor 204 may comprise a specially configured application specific integrated circuit (ASIC). The processor 204 generally functions to run programming code or instructions implementing various of the functions performed by the endpoint 104, 108. As will be described in greater detail herein, such functions may include, in the case of a content sharing endpoint, the association of content with a voice communication session.

An endpoint 104, 108 may additionally include memory 208 for use in connection with the execution of programming by the processor 204, and for the temporary or long term storage of program instructions and/or data. As examples, the memory 208 may comprise RAM, SDRAM, or other solid state memory. Alternatively or in addition, data storage 212 may be provided. In accordance with embodiments of the present invention, data storage 212 can contain program instructions or code implementing various of the applications executed by the endpoint 104, 108, and data that is used and/or generated in connection with the execution of applications. Like the memory 208, the data storage 212 may comprise a solid state memory device. Alternatively or in addition, the data storage 212 may comprise a hard disk drive or other random access memory. In accordance with still other embodiments, the memory 208 may provide random access storage, while some or all of the data storage 212 may comprise read only storage.

Examples of application programming or instructions that can be stored in data storage 212 includes a telephony application 216, and a text to speech conversion application or engine 220. The data storage 212 may also function to store computer files or content 224, such as text or audio files, comprising content that can be shared by a content sharing endpoint 104. The content 224 may be of various types. For example, content 224 may comprise audio files. As a further example, the content 224 may comprise files containing text that can be played over an audio communication otherwise comprising a voice telephony session after processing by the text to speech conversion application 220. Alternatively or in addition, content 224 available for sharing may be stored in a content server 120. In accordance with embodiments of the present invention, the content 224 comprises IVR scripts. The data storage 212 may additionally provide storage for operating system software 228. The content 224 may be stored on or in association with another device, such as on or for a call server 116 operating as an IVR system. Accordingly, the content 224 that is in data storage 112 may comprise only an identification of each available item of content 224, rather than the content 224 itself. In addition to providing an operating environment for applications running on the endpoint 104, 108, the operating system software 228 may provide and control the functions of a user interface presented by the endpoint 104, 108 to the user of that endpoint 104, 108. For example, the operating system software 228 may provide a graphical user interface.

Another application that can be stored in data storage 212 is a content sharing application 230. The content sharing application 230, in accordance with embodiments of the present invention, provides functionality that allows a user of a content sharing endpoint 104 to add content 224 comprising, stored in or associated with a computer file, to a voice or audio communication established over the voice telephony network 112, for example between the content sharing endpoint 104 and a client endpoint 108. Moreover, as described in greater detail elsewhere herein, the content sharing application 230 enables a representation of content 224, for example in the form of an identification of a computer file comprising content, to be associated with an in-progress voice communication, by dragging and dropping that representation of the content 224 into a representation of the voice communication presented by the telephony application 216, in cooperation with the graphical user interface generated by operation of the operating system software 228. An endpoint 104, 108 also generally includes one or more user input devices 232. Examples of user input devices 232 include a keyboard, a pointing device combined with a display screen or other position encoder, a microphone or other audible input device, a keypad, and a touch screen display. In addition, one or more user output devices 236 may be provided. Examples of user output devices 236 include a display and audio output device. An endpoint 104, 108 also generally includes one or more communication network interfaces 240. Examples of communication network interfaces 240 that may be included in an endpoint 104, 108 include a packet data network interface, such as a wired or wireless Ethernet interface or cellular packet data interface, a telephony network interface, or other wireless or wireline interfaces.

As can be appreciated by one of skill in the art after consideration of the present disclosure, the included components of a content sharing endpoint 104 may differ from those of a client endpoint 108. For example, a client endpoint 108 typically will not include a text to speech conversion application 220, text or audio files 224 comprising content available for sharing, a content sharing application 230, although such applications and files may be present on a client endpoint 108. In addition, it should be appreciated that other endpoint 104, 108 configurations are possible. For example, a client endpoint 108 may comprise a common, analog public switched telephony network (PSTN) telephone.

Figure 3:
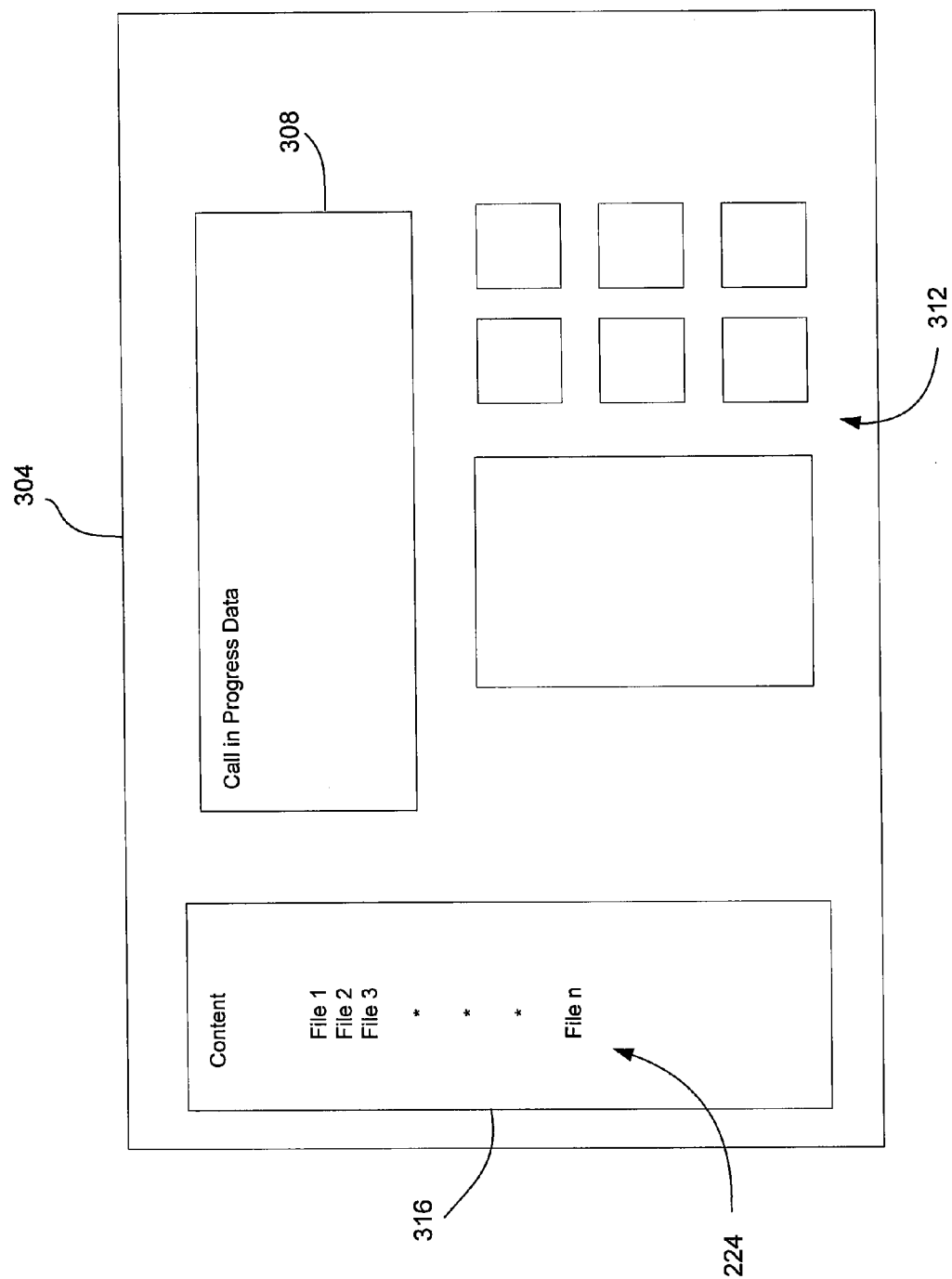
FIG. 3 depicts a graphical user interface displayed to a user of a content sharing endpoint in accordance with embodiments of the present invention.

FIG. 3 depicts a graphical user interface 304 displayed to a user of a content sharing endpoint 104 in accordance with embodiments of the present invention. According to this exemplary graphical user interface display 304, an area containing call in progress data 308 is displayed to the user of the content sharing endpoint 104. The call in progress data 308 can include any data associated with a voice telephony communication. Accordingly, the graphical user interface 304 can be understood to operate in cooperation with a soft phone application or telephony application 216. Examples of the call in progress data include the time the call has been active, and information identifying the client 108 or other endpoint or endpoints in communication with the content sharing endpoint 104 displaying the graphical user interface 304 to a user of that endpoint 104.

The graphical user interface 104 may additionally present control buttons 312. These control buttons 312 generally allow the user of the content sharing endpoint 104 to control aspects of the operation of the endpoint 104. Accordingly, control buttons 312 may be provided for performing such functions as dropping the call, conferencing in another party, placing an active call on hold and activating a mute function. The control buttons 312 may also present a virtual keyboard or virtual numeric keypad, and controls associated with playing selected content 224.

In addition, a graphical user interface 304 in accordance with embodiments of the present invention presents a representation 316 of one or more files comprising content 224 that can be selected by the user of the content sharing endpoint 104 and shared with a client endpoint 108. The representation 316 of the available content 224 may take various forms. For example, the representation 316 may comprise a list of files or content 224 that a user of the content sharing endpoint 104 presenting the graphical user interface 304 can select using an input 232 comprising a pointing device. As another example, an item of content 224 can be selected from a drop down list included as part of a hierarchical or categorized menu presented by the graphical user interface 304. For instance, the representation 316 may be a listing of content 224 comprising available IVR scripts, ordered or categorized by topic. As yet another example, a specific item of content 224 can be located by entering search terms, for example via control buttons 312 presented by the user interface 304 or other user input 232 provided by the content sharing endpoint 104, and the item or items of content 224 responsive to the query can be presented as the representation of files 316. The list or menu of available content 224 may be generated by the content sharing application 230 and may comprise a selection of content 224 that the content sharing application 230 is capable of sharing over a voice communication channel. Alternatively, the list of content 224 may simply be a list of files generally available to the content sharing endpoint 104 that has not been filtered for compatibility with the content sharing application 230.

In general, while a call is in progress, as represented by the call in progress data 308, the user of the content sharing application 230 can select an item of content 224 from the representation 316, and drag that representation to the depiction of the active call in the call in progress data 308 portion of the graphical user interface 304. By dropping the selected item of content 224 into the active call in the call in progress data 308 area, the content comprising the file 224 is shared. More particularly, the content sharing application 230 may play audio output generated or derived from the selected item of content 224 over the voice channel established between the endpoints 104, 108. Accordingly, the graphical user interface 304 can be understood to operate in cooperation with the content sharing application 230.

Figure 4:
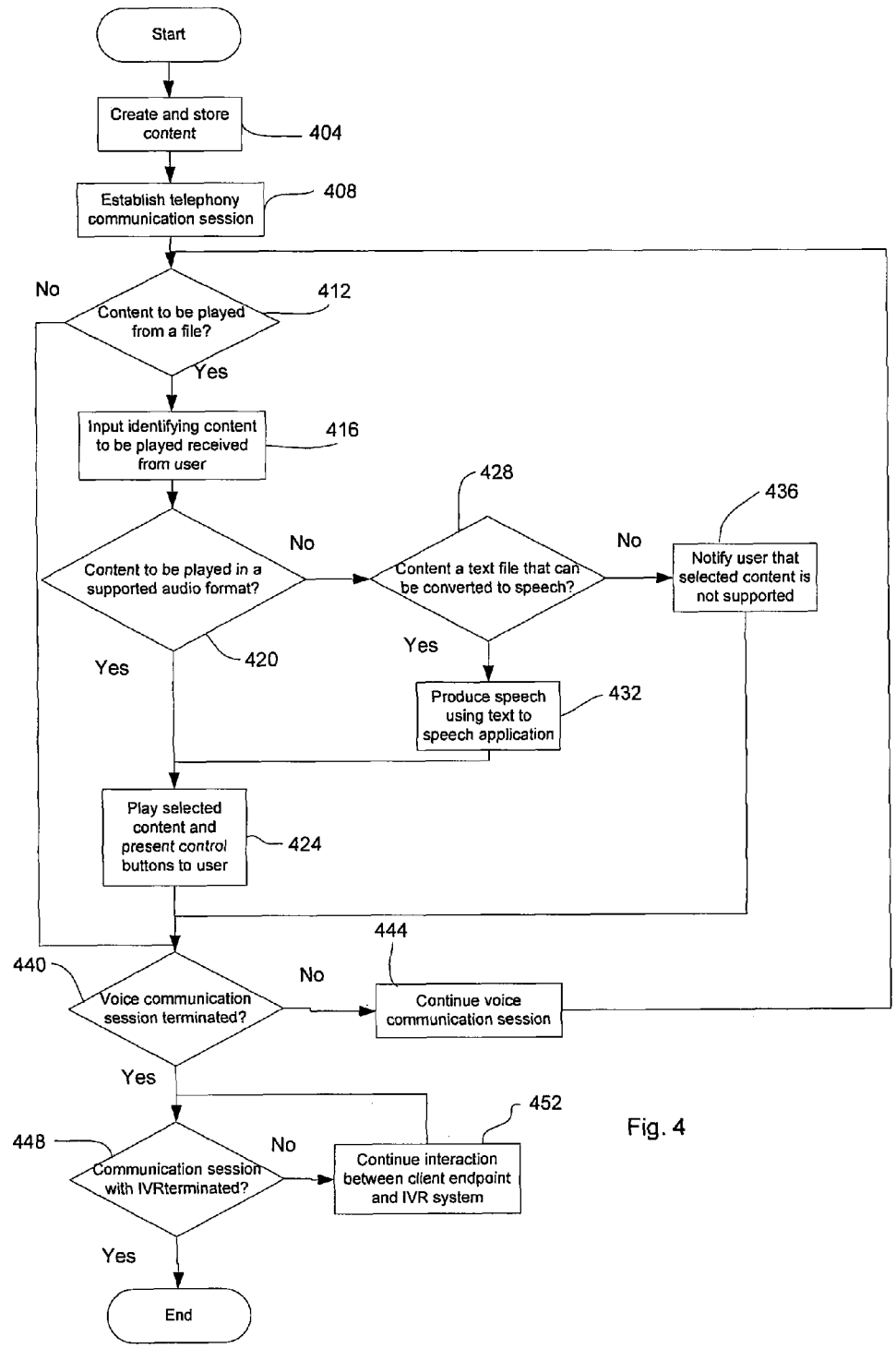
FIG. 4 is a flowchart depicting aspects of the operation of a system in accordance with embodiments of the present invention.

With reference now to FIG. 4, aspects of the operation of a communication system 100 comprising a content sharing application 230 in accordance with embodiments of the present invention are illustrated. Initially, content 224 is created (step 404). This content 224 may be in various forms. For example, the content 224 may comprise audio files, such as music, podcasts, and the audio portion of multimedia files or content. Moreover, examples of the types of files that may comprise such content 224 include, without limitation, .mp3, .wav, and .dss files. In accordance with further embodiments of the present invention, the content 224 need not comprise audio information, at least in a native format. For example, the content 224 may comprise content capable of transformation to an audible format. Accordingly, content 224 may comprise text files or files containing text, and the portion of that content 224 that is shared as part of a telephony communication, for example between the content sharing endpoint 104 and a client endpoint 108, can comprise speech generated by a text to speech engine 220, that is provided with the text included in the selected content 224 for transformation to speech. The content 224 can be stored in data storage 212 provided as part of the content sharing endpoint 104. Alternatively or in addition, content 224 may be stored in another device, such as a content sharing server 120.

At step 408, a telephony communication session is established between the content sharing endpoint 104 and a client endpoint 108. In general, the connection is made through the call server 116. Either endpoint may initiate the communication session. In addition, more than two endpoints may participate in the communication session. Where the communication session is initiated by a client endpoint 108, the user of the initiating client endpoint 108 may be required to provide some information to a call routing system or function implemented by the call server 116, prior to being connected to the content sharing endpoint.

At step 412, a determination is made by the user of the content sharing endpoint 104 (e.g., the agent) as to whether content comprising a computer file 224 should be played from a stored file over the audio call or audio bridge comprising the telephony communication. If it is determined that content 224 should be shared, input from the user of the content sharing endpoint 104 selecting the item of content 224 to be shared is received (step 416). More particularly, in accordance with embodiments of the present invention, such input comprises a selection of an item of content 224 from a representation of such content 316, and dragging and dropping that representation into a call status bar presented as part of call in progress data 308, all of which are displayed to the user of the content sharing endpoint 104 by the graphical user interface 304. Accordingly, the user can graphically associate a selected item of content 224 with an in progress call or voice communication. The selection of a particular item of content 224 by an agent or other user of the content sharing endpoint 104 may be in response to a specific request for information received from a customer or other user of the client endpoint 108. More particularly, the agent can apply their knowledge of the problem, IVR system, or access to IVR system search facilities, or other tools, to identify content 224 comprising an IVR script that the agent believes would be useful to the customer. Accordingly, the agent is available to determine the particular IVR script that is likely of use to the customer, rather than requiring that the customer navigate the IVR system alone.

At step 420, the content sharing application 230 determines whether the selected content 224 is in a supported audio format. If the selected content 224 is in a supported audio format, the content sharing application 230 plays or streams the audio content into the voice communication (step 424). Moreover, playing the selected content may invoke an IVR system running on the call server 116 or other server or device. After or when playback of an audio or text file is initiated, the graphical user interface 104 may present control buttons 312 that allow the user to manage playback of the session. Examples of such controls can include controls that allow the user to pause, play or stop the stream being shared as part of the voice communication. In addition, after playback of the selected content 224 has been initiated, the user of the content sharing endpoint 104 (i.e. the agent) can drop off the call, leaving the client endpoint 108 in communication with the IVR system.

If the selected content does not comprise a supported audio file, a determination is made as to whether the selected content 224 is a file containing text (step 428). If the file is determined to contain text, it is provided to the text to speech engine 220 for conversion (step 432), and the resulting speech is added to the voice communication session. If the selected content 224 does not comprise a text file and/or is otherwise not in a supported format, the user of the content sharing endpoint 104 may be notified (step 436), so that different content 224 can be selected, or a plug-in or other facility necessary to share that content 224 can be obtained.

At step 440, a determination may be made as to whether the voice communication session or channel between the content sharing endpoint 104 and the client endpoint 108 has been terminated. In a typical scenario, the agent will drop off of the communication channel after playback of the selected content has been initiated, leaving the customer or user of the client endpoint 108 in communication with, for example, the call server 116, or other server performing the IVR system function. If the voice communication session between the endpoints 104 and 108 has been terminated, the process may end. If the voice communication session has not been terminated, the voice communication session continues (step 444), and the process can return to step 412.

If the voice communication session between the endpoints 104 and 108 has been terminated, a determination can be made as to whether the communication channel between the client endpoint 108 and the call server 116 has been terminated (step 448). If the communication channel between the client endpoint 108 and the call server 116 has not been terminated, the user of the client endpoint 108 can continue to interact with the IVR function of the call server 116, even after playback of the selected content 224 has been completed (step 452). Moreover, the interaction can be from the point within the structure of the IVR system occupied by the script comprising the content 224 selected by the agent. If the voice communication session between the client endpoint 108 and the call server 116 has been terminated, the process may end.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for selecting and providing content over a voice telephony network, comprising:
    establishing an audio communication session using the voice telephony network, wherein the audio communication session places the first communication endpoint at a first location in audio communication with a second communication endpoint at a second location, wherein the audio communication session between the first communication endpoint and the second communication endpoint supports only audible communications, and wherein the audio communication session is the only communication link between the first and second communication endpoints;
    displaying a graphical representation of the audio communication session established using the voice telephony network at a first communication endpoint;
    determining a need to share content, wherein the content is available as a computer file comprising an interactive voice response system script;
    in response to input from a user of the first communication endpoint, associating the computer file with the established audio communication session, wherein the input from the user of the first communication endpoint includes using an input device to drag a representation of the computer file to a graphical representation of the established audio communication session;
    initiating the playback of an audible output from the computer file as part of the audio communication session, wherein at least a portion of the audible output from the computer file is presented to a user of the second communication endpoint over the voice telephony network as part of the audio communication session, and wherein the audible output is presented to the user of the second communication endpoint by the second communication endpoint;
    after the user of the first communication endpoint provides input associating the computer file, the user of the first communication endpoint dropping off of the audio communication session, wherein the audible output from the computer file continues to be presented to the user of the second communication endpoint after the user of the first communication endpoint has dropped off the audio communication session.

2. The method of claim 1, wherein associating the computer file with the audio session is performed by a communicant at the first location, and wherein the communicant at the first location is the user of the first communication endpoint.

3. The method of claim 2, wherein associating the computer file with the audio session includes the communicant at the first location dragging a graphical representation of the computer file to the graphical representation of the audio communication session.

4. The method of claim 2, wherein the audible output is received by a communicant at the second location, wherein the communicant at the second location is the user of the second communication endpoint.

5. The method of claim 1, further comprising:
    determining the format of the computer file.

6. The method of claim 5, further comprising:
    in response to determining that the computer file includes a text file, processing content included in the computer file to convert the content to an audible output using a text to speech facility.

7. The method of claim 5, further comprising:
    in response to determining that the computer file does not include an audio file, converting content included in the computer file to an audible output.

8. The method of claim 1, wherein a first communicant at the first location and a second communicant at the second location are in audio communication with one another only during the established audio communication session.

9. A system for supporting voice communications, comprising:
    a first communication endpoint, including:
        a voice input device operable to receive speech from a first user;
        an audio output device;
        a display operable to display visual information to the first user; and
        a graphical user interface displayed to the first user by the display, wherein the graphical user interface displays an audio session status for a first in progress audio session and a representation of at least a first interactive voice response (IVR) script to the first user;
    a second communication endpoint, including:
        a voice input device operable to receive speech from a second user; and
        an audio output device;
    a call center server, wherein the first communication endpoint and the call center server are in communication with the second communication endpoint through a voice telephony network, wherein in response to input from the first user selecting the first IVR scripts and graphically associating the first IVR scripts with a first audio session an audio output from the call center server comprising playback of the IVR script is output by the call center server to the second communication endpoint over the voice telephony network as part of the first in progress audio session, wherein the second communication endpoint is only connected to the first communication endpoint and the call center server by the first audio session, and wherein the first audio session is established using the voice telephony network, wherein graphically associating the first IVR script with the first audio session includes dragging the representation of the first IVR script presented by the graphical user interface to the audio session status presented by the graphical user interface, wherein the audible output from the first IVR scripts continues to be presented to the user of the second communication endpoint after the user of the first communication endpoint has dropped off the audio communication session.

10. The system of claim 9, wherein the first communication endpoint further includes:
a pointing device, wherein graphically associating the first IVR script with the first audio session includes dragging a representation of the first IVR script presented by the graphical user interface to the audio session status presented by the graphical user interface.

11. The system of claim 10, wherein the first IVR script is a text file, and wherein the software includes a text to speech application.

12. The system of claim 9, further comprising:
data storage, wherein the first IVR script is stored on the data storage.

13. A communication system, comprising:
a first communication endpoint, including:
  a display;
  an audible information input device;
  an audible information output device;
  a pointing device;
  a processor;
  data storage, wherein a representation of a plurality of available interactive voice response (IVR) scripts is presented to a user of the first communication endpoint by the display;
a call server, wherein the call server implements an IVR system;
a communication network;
a telephony application, wherein a representation of a first in progress voice communication including the first communication endpoint is presented to the user of the first communication endpoint by the display;
a content sharing application, wherein the content sharing application is operable to initiate the playback of a selected IVR script into the first in progress voice communication;
a second communication endpoint, including:
  an audible information input device;
  an audible information output device;
  wherein the first communication endpoint and the call server are in communication with the second communication endpoint through only the first in progress voice communication, and wherein the first in progress voice communication is established over the communication network,
  wherein the first in progress voice communication established over the communication network only passes audible information between the first and second communication endpoints,
  wherein the audible information passed between the first and second communication endpoints over the communication network as part of the first in progress voice communication includes voice data from a user of the first communication endpoint, voice data from a user of the second communication endpoint, and audible data produced from at least the selected IVR script provided by the call server, and wherein the IVR script is selected by the user of the first communication endpoint operating the pointing device to drag and drop a representation of the IVR script onto the representation of the voice communication, and wherein the audible data produced from the selected IVR script continues to be provided to the second communication endpoint after the first communication endpoint is dropped from the cell.

14. The system of claim 13, wherein the first communication endpoint is interconnected to the communication network through a communication server.

15. The system of claim 13, wherein the IVR script contains audio data, and wherein at least some of the audio data is transmitted by the communication network from the first communication endpoint to the second communication endpoint.

16. The system of claim 13, wherein the first communication endpoint further includes a text to speech application, wherein the text to speech converts text included in the IVR script to speech, and wherein the speech is transmitted by the communication network from the first communication endpoint to the second communication endpoint.

17. The system of claim 13, wherein the first communication endpoint includes a soft phone application, and wherein the communication network includes a voice telephony network.

18. The system of claim 13, wherein the second communication endpoint is a conventional public switched telephony network telephone.

* * * * *

UNITED STATES PATENT AND TRADEMARK OFFICE
CERTIFICATE OF CORRECTION

PATENT NO. : 8,363,796 B2
APPLICATION NO. : 12/579842
DATED : January 29, 2013
INVENTOR(S) : Ashutosh Adkar et al.

Page 1 of 1

It is certified that error appears in the above-identified patent and that said Letters Patent is hereby corrected as shown below:

In the Claims:

Column 12, line 20, Claim 13, delete "cell" and insert --call--.

Signed and Sealed this
Fourth Day of June, 2013

Teresa Stanek Rea
*Acting Director of the United States Patent and Trademark Office*